UNITED STATES PATENT OFFICE.

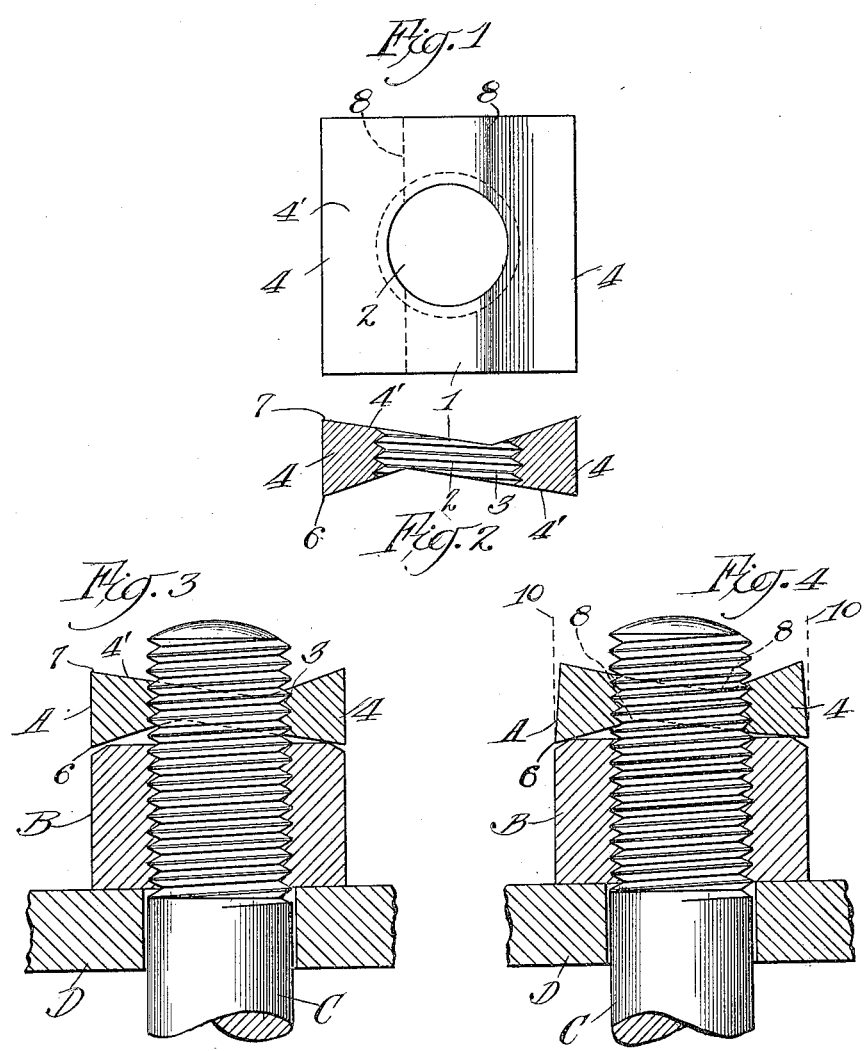

CHARLES GILBERT HAWLEY, OF CHICAGO, ILLINOIS, ASSIGNOR TO K. NUT CO., OF CHICAGO, ILLINOIS, A CORPORATION OF ILLINOIS.

NUT-LOCK.

1,154,698.   Specification of Letters Patent.   Patented Sept. 28, 1915.

Application filed September 24, 1912. Serial No. 722,026.

*To all whom it may concern:*

Be it known that I, CHARLES GILBERT HAWLEY, a citizen of the United States, residing at Chicago, in the county of Cook and State of Illinois, have invented a certain new, useful, and Improved Nut-Lock, of which the following is a specification.

My invention relates to improvements in nuts for use upon threaded bolts, and has particular reference to improvements in means for locking threaded nuts upon and with threaded members, such as bolts.

The object of my invention is to provide an efficient, simple, one-piece nut lock which can be manufactured at low cost; and a further object of my invention is to provide a nut lock of relatively light weight, the material in which shall be distributed in such a manner that when the nut lock is forced against the home nut the threaded opening in the nut lock will be forcibly compressed, and the threads thereof will be brought into intimate contact with and set firmly against the threads of the bolt, and thereby effectually prevent the loosening of both itself and the home nut.

Another object of my invention is to provide a nut lock adapted by engagement with a home nut to lock itself and the home nut against accidental movement off the bolt, and which shall be capable of maintaining its locked position even independent of engagement with the home nut.

My invention consists generally in a nut lock of unique form and construction by means of which the objects named above and others which will hereinafter appear are attained.

My invention will be more readily understood by reference to the accompanying drawings forming a part of this specification and in which:

Figure 1 is a plan view of a square nut lock embodying my invention; Fig. 2 is a cross section thereof; Fig. 3 is a sectional view showing a home nut in position upon a bolt against a load surface and showing my improved nut lock in the position first engaging the home nut; and Fig. 4 is a view similar to Fig. 3 but showing my improved nut lock screwed tightly against the home nut whereby it is slightly distorted.

A nut lock is used primarily in connection with a home or ordinary nut. The home nut is screwed against a load surface and is capable of withstanding the strain of the bolt. Such nuts, however, when subjected to vibration and from other causes as well, often become loose, recede from the home or load surface and unless tightened finally drop off and are lost. My nut lock is not intended to take the strain of the load, but is intended to prevent the home nut from backing away from the load. I do this by preventing the home nut from getting any play whereby it can back off, become loose or change its position in the slightest degree. An ordinary nut intended to withstand the strain of the bolt must necessarily be provided with enough threads to withstand any shearing strain to which it is subjected, and this usually determines its thickness. Since my nut lock does not have to stand the strain of the bolt, it can be made much thinner and lighter than the home nut that it is intended to lock in place. This is a large factor as to cost of manufacture. My nut can be cheaply made by rolling long strips into proper cross sectional shape and then simultaneously cutting and punching them. It is desirable that the threaded opening in the nut lock be made of such size that the nut lock can be quickly and easily screwed into position against the home nut. I can, of course, tap the bolt hole any size desirable, that is, to form a finger fit, wrench fit, etc., but since the nut lock is bound in place by engagement with the home nut, I prefer to make it of such size that it can be easily screwed up to a position contacting the home nut. When it reaches this position considerable effort is necessary to advance it farther, but as only a slight advance beyond this position is necessary it is capable of being quickly made to bind or grip the bolt and home nut in such manner that the two nuts are not only bound together relatively immovable, but they are also firmly held upon the bolt against unintentional movement or rotation.

Referring now to the drawings, A represents a nut lock, B the home nut, C the bolt and D the load or bearing surface. The nut lock A is shown square here, but when I show a square nut or refer to a square nut herein, I wish it to be understood that I may make the nut square, hexagonal or such other polygonal form wherein the functions of this nut can be maintained. The nut comprises a central portion 1, which is quite thin. A bolt hole 2, provided with threads 3, is arranged in the nut at an angle, preferably other than right angles, to the central portion. The nut is thickened adjacent two opposed edges by projections or abutment ribs 4 which extend outwardly from opposite nut faces. In this manner each nut face comprises an inclined portion in the plane of the central portion which extends from the projection 4 to the opposite side or edge of the nut. For reasons hereinafter set forth, the projecting portions 4 preferably rise from lines symmetrically disposed from the bolt hole center but at a distance therefrom, less than the bolt hole radius. Since the faces of the projecting portions are to contact the tops of the home nut like the nut faces 4' I prefer to incline same. Thus I provide oppositely inclined portions on each nut face. As best shown in Fig. 1 the opposite thick portions of the nut contain arc-like portions of the threads. I so make the angles of the face 4' and that of the projecting portion 4 that the edge 6 of the projecting portion is substantially in line with or in the same plane as the opposite edge 7 of the nut. The same relation is maintained on each side of the nut so that it is therefore reversible. The nut can be used with either face toward the home nut and once it has been used and been distorted to a certain extent in one direction, it can be reversed when used a second time and thereby be distorted in the opposite direction. As the nut is screwed upon the bolt, the crown of the home nut is first contacted by one side of the nut and shortly thereafter by the other side. This position is indicated in Fig. 3, where the position depicted is that in which the nut lock first contacts the home nut, and, as previously described, I prefer to make my nut lock threaded opening of such size that it can be freely screwed on to this position. From this position on it takes considerable force to move the nut forward, because any further movement thereof can be accomplished only by a bending of the nut lock. In Fig. 4 I have shown the nut lock advanced somewhat farther than the position indicated in Fig. 3 and have depicted as nearly as possible the distortion of the nut lock and the threads. As the nut is advanced the thick portions are bent back substantially along the lines 8, 8 and the sides of the nut are bent inwardly from their original planes, as indicated by the dotted lines 10, 10 in Fig. 4. Since there is a portion of the threads carried by the nut lock exterior to the bending line, these threads must necessarily move back with the part of the nut that is bent. This causes the threads in engagement with this portion to be slightly distorted or bent backward. In this position the nut is firmly locked against unintentional movement upon the bolt. Since there is considerable friction between the nut lock and the home nut, the nut lock prevents the home nut from rotating upon the bolt and two nuts are therefore held against relative movement both as regards each other and the bolt.

For some purposes I prefer to make my nut lock of such material that when the sides are slightly forced back by engagement with the home nut they will take a substantially permanent set. Then should the home nut recede from the lock nut it will nevertheless be firmly locked in place. In other words I sometimes make my nut of such metal that its elastic limit is practically reached by the forceful distortion to which it is subjected in use.

It should be obvious from the foregoing description that the objects and purposes outlined in the opening of this specification are attained in the structure herein disclosed, but since I can conceive of other slightly modified forms which will accomplish in a measure the objects that I am seeking, I do not wish to limit my invention to the one form herein shown, but prefer that the scope of my invention shall be judged by the claims hereunto appended.

Having thus described my invention, I claim as new and desire to secure by Letters Patent:

1. A nut lock of the class described, provided with a threaded bolt hole, a thin middle portion angularly disposed to the bolt hole, projecting portions disposed on alternate faces and opposite sides of the nut, said projecting portions rising from lines spaced from the bolt hole center but within the bolt circle, as and for the purpose specified.

2. A nut lock having a centrally arranged threaded bolt hole and comprising a flat thin central portion of substantially uniform thickness angularly disposed to the bolt hole, abutment ribs projecting from opposite faces of the nut and disposed at opposite sides thereof, the said abutment ribs meeting the central portion of the nut at a distance from the center of the bolt hole, less than the radius thereof, as and for the purpose specified.

3. A nut lock having a centrally arranged threaded bolt hole and comprising a flat, thin, central portion of substantially uniform thickness angularly disposed to the bolt hole, abutment ribs projecting from opposite faces of the nut and disposed at opposite sides thereof, the said abutment ribs meeting the central portion of the nut at a distance from the center of the bolt hole less than the radius thereof, the outer edge of said projecting rib and the opposite nut edge both being in the same plane which is at right angles to the bolt hole and the nut being adapted by forceful contact with a home nut to be bent or distorted slightly and thereby to clamp the bolt and to prevent unintentional rotation of the nut.

4. A threaded bolt and a home nut in position thereon, said nut having an upper chamfered edge, in combination with a nut lock having a threaded opening, the central portion of said nut lock being of substantially flat uniform thickness and angularly disposed to the threaded opening, a transverse wedging abutment rib on its lower face, inclined to meet the thin central portion within the bolt hole, said inclined rib adapted to engage the home nut at substantially the same time as the oppositely inclined portion of the lower face and to be wedgingly forced against the home nut, as and for the purpose specified.

5. The herein described nut lock having a centrally arranged threaded bolt hole and comprising conversely arranged opposite nut faces, each face comprising an outwardly inclined major portion and an outwardly oppositely inclined smaller portion, the two portions meeting on lines spaced from the bolt hole center and at a distance therefrom less than the bolt hole radius, the outer edges of the inclined faces being in a single plane substantially perpendicular to the longitudinal axis of the bolt hole.

6. The herein described nut lock comprising a bolt and a home nut in position thereon, a nut lock having a threaded hole and adapted to be easily screwed to position contacting the home nut, a relatively thin angularly arranged central portion of the lock nut being equally disposed on each side of the center and of less width than the diameter of the bolt hole, conversely arranged transverse abutment ribs projecting from opposite faces of the nut from the outer limits of the thin central portion whereby arc-like portions of the threaded bolt hole are contained in the oppositely disposed thicker portions of the nut, said thicker portions being adapted by forceful engagement with the home nut to be bent back slightly and thereby move the threads contained thereon into powerful frictional engagement with the bolt threads, whereby unintentional rotation of the home nut and bolt is prevented.

7. The combination with a bolt and a home nut in position thereon of a nut lock, provided with a threaded bolt hole, having the major part of the under surface arranged at a slight angle to the opposed surface of the home nut for frictional contact therewith, and a downwardly and outwardly inclined transverse rib thereon arranged to contact with the home nut at the opposite side, whereby when the nut lock is forced against the home nut, the body portion of the nut lock containing the rib is forced inwardly against the body of the bolt.

8. The combination with a bolt and a home nut in position thereon of a nut lock provided with a threaded bolt hole having the major part of the under surface arranged at a slight angle to the opposed surface of the home nut for frictional contact therewith, and a downwardly and outwardly inclined transverse rib thereon arranged to contact with the home nut at the opposite side, a conversely arranged upper face having a transversely arranged rib thereon adapting the nut for reversal, said ribs being bent inwardly by engagement of the nut lock with the home nut, whereby the nut lock is clamped against the body of the bolt and unintentional rotation of the home nut and the nut lock is prevented.

In testimony whereof, I have hereunto set my hand, this 2d day of July, 1912, in the presence of two subscribing witnesses.

CHARLES GILBERT HAWLEY.

Witnesses:
ARTHUR W. NELSON,
JOHN R. LEFEVRE.

Copies of this patent may be obtained for five cents each, by addressing the "Commissioner of Patents, Washington, D. C."